United States Patent [19]

Coutrot

[11] Patent Number: 5,615,265
[45] Date of Patent: Mar. 25, 1997

[54] PROCESS FOR THE TRANSMISSION AND RECEPTION OF CONDITIONAL ACCESS PROGRAMS CONTROLLED BY THE SAME OPERATOR

[75] Inventor: Francoise Coutrot, Cesson Sevigne, France

[73] Assignees: France Telecom; Telediffusion de France, both of Paris, France

[21] Appl. No.: 359,597

[22] Filed: Dec. 20, 1994

[30] Foreign Application Priority Data

Jan. 19, 1994 [FR] France .................................. 94 00528

[51] Int. Cl.⁶ .................................................. H04N 7/167
[52] U.S. Cl. ...................................... 380/20; 380/14
[58] Field of Search ........................... 380/20, 14, 13, 380/23, 12, 10, 16, 21

[56] References Cited

U.S. PATENT DOCUMENTS 4,947,428  8/1990  Guillou et al. .
5,224,161  6/1993  Daniel et al. ............................ 380/14
5,349,641  9/1994  Coutrot et al. .

FOREIGN PATENT DOCUMENTS 0528730  2/1993  European Pat. Off. .

*Primary Examiner*—David C. Cain
*Attorney, Agent, or Firm*—Oblon, Spivak, McClelland, Maier & Neustadt, P.C.

[57] ABSTRACT

Process for the transmission and reception of conditional access programs controlled by the same operator.

According to the invention, specific check words (MCSi) are formed for various programs of the same operator from a root check word individual to said operator. The check words of the access titles include a part which is common to all the programs controlled by the same operator and a part which is specific to each program.

Uses in television, radio, data transmission, messaging, etc.

10 Claims, 4 Drawing Sheets

PROCESS FOR THE TRANSMISSION AND RECEPTION OF CONDITIONAL ACCESS PROGRAMS CONTROLLED BY THE SAME OPERATOR

DESCRIPTION

TECHNICAL FIELD

The present invention relates to a process for the transmission and reception of conditional access programs, which are controlled by the same operator. The invention applies to television, radio, messaging, data transmission, etc.

In both the following description and the claims, the term "programs" will be used when referring to conventional programs (e.g. television, radio, etc.), as well as the elements forming said programs, such as e.g. a video, sound, data element and the like.

The considerable increase in broadcasting supports (satellites, cables, microwaves) and the corresponding increase in the broadcasting capacity on said supports (digital television and radio methods) have led program operators to increase offers of audiovisual, sound and data services. In particular, in digital television and radio, due to compression methods, program operators are able to offer several programs for a transmission cost equivalent to the transmission of a single program in analog form.

Thus, there will be an increase in radio or television services on offer through an organization in the form of program "clusters", each of which proposes several programs controlled by the same program operator. In the same way, a multibroadcasting program offer can be proposed (Near Video On Demand). In this case, the same television program is broadcast simultaneously on several logic channels by the same operator, with a time shift for the start of each version of the program (the time shift typically being a few minutes between each start). This enables the user to have access to a transmission broadcast in multibroadcasting form with a maximum waiting time of a few minutes).

The common feature of these new services, such as program clusters or multibroadcasting, is that several simultaneously broadcast programs are controlled by the same program operator and only the access conditions to the actual programs can change from one program to another.

It should be noted that this feature is also applicable to a program controlled by an operator, whose program elements (video, sound, data) are marketed according to different access conditions. In the remainder of the present description, the term "multiprogramming" will be used to define the offer of several programs or program elements by the same program operator.

The principle of the access control to such services is based on the scrambling of the program (video and/or sound and/or data) on transmission and the descrambling or unscrambling of the message received under the control of an access title. The scrambling and descrambling systems are initialized by a data item, which generally varies in random manner and which is called the "check word". The informations describing the access criteria to the program, as well as a protected form of the check word are included in the check messages of the access titles accompanying the scrambled program.

To have access to a scrambled program, it is necessary that the conditional access device can exploit one of the check messages of the access titles associated with the program. In the case of programs belonging to a multiprogramming, each of the programs must only be restorable in uncoded form by recipients having adequate access conditions for said program.

PRIOR ART

Existing processes making it possible to protect access to a broadcast program consist of allocating to each program a check message for the access titles. This method is widely used in existing pay or toll television services for which each channel is controlled by different program operators.

Each check message of the access titles in general has four fields:
- an identifier (specific to one program operator) of the service and the service key used,
- a field defining the access conditions to be satisfied in order to have the right of access to the program,
- the cryptogram or cryptograms of one or several check words,
- optionally a redundancy field, which can be added so that the security processor cannot be used outside the intended context.

When the security processor contains an appropriate access right, i.e. when it holds the service key indicated by the identifier and one of the access conditions indicated by the access condition field, the processor decrypts the cryptogram or cryptograms in order to reconstitute the check word or words. This check word enables the terminal to descramble the program or the program element or elements with which it is associated.

With the increase in the number of channels, the organization of programs will be concentrated around multiprogramming offers. With existing methods, conditional access to programs belonging to the same program operator will make it necessary to produce the same number of check messages of the access titles as there are different access conditions for having access to these programs.

These methods would not benefit from the synergy expected of a grouping of programs under the banner of the same operator and would therefore not be optimized by the resource necessary for broadcasting access check messages assignable to said programs. This is even more prejudicial as the offered programs use a restricted resource (case of radio using resources as from 32 kbit/s or wide audience data services such as the news, weather forecast, etc.).

The object of the present invention is to obviate these disadvantages.

DESCRIPTION OF THE INVENTION

In the present invention it is considered that, as in the case of an offer of television programs controlled by different service operators, the users of programs in multiprogramming acquire one or more access rights to one or other programs offered by the operator by means of existing access title control methods.

The offer of programs in multiprogramming by the operator is then broken down into the same number of programs as there are logic channels. Each program or program element is then scrambled on the basis of specific check words. There is the same number of specific check words as there are different access conditions for accessing the programs, so as to guarantee that only authorized recipients receive the programs.

These specific check words are calculated by a security processor on the basis of a "root" check word valid for all the programs belonging to the same program operator and diversified by using a diversification parameter specific to the program (e.g. logic channel reference of the program or program element or access conditions).

With the transmitted programs is associated the transmission of access check messages. According to the invention, the access check messages are broken down into two parts:

- a first part, which is common to all the programs constituting the offer of the program operator, will contain the program identifier and the cryptogram or cryptograms of the "root" check words of the programs in multi-programming;
- a second part, which is specific to each of the programs or program elements constituting the offer, will contain the access conditions to the program and the cryptographic redundancy guaranteeing the authenticity and integrity of the message, the specific check word then being recalculated by the security processor on the basis of the root check word and the diversification parameter retained, if the security processor contains an access condition in accordance with one of those which are expected.

Whilst ensuring a differentiated access to programs controlled by the same program operator, by means of the different access conditions this method makes it possible to considerably reduce the data resource necessary for the check messages of the access titles for the same program operator. Typically, in an operating mode with existing methods, it is necessary to transmit a useful rate of approximately 1 Kbit/s in order to transmit access check messages associated with an access condition (assuming a repetition rate of two messages per second). The use of this method makes it possible to "factorize" data such as the service identifier and the root check word and divide by more than 2 the size of the part specific to each program. Thus, typically, it is necessary to have a resource of N Kbits/s in order to render secure N programs or program elements controlled by the same operator using conventional processes, said method making it possible to bring the resource necessary to (N+1)/2 Kbits/s.

This method rapidly becomes effective in the "program cluster" mode or multibroadcasting of the same program (the same program can be broadcast simultaneously on about ten logic channels), in which case the gain is approximately a reduction by 2 of the necessary resource.

This method is all the more valuable if the service is organized into programs or program elements using a restricted resource (e.g. wide audience data service or radio).

More specifically, the present invention relates to a process for the transmission of conditional access programs in which, in conventional manner, the programs are scrambled by a check word (MC), an access title check message (MCTA) is formed, which in particular contains access criteria (CA) and at least one cryptogram of at least one check word (CMC) obtained by using an encrypting algorithm (AC) and the scrambled program (PE) and the access title check message (MCTA) are transmitted. The process according to the invention is characterized in that for programs (Pi), which are controlled by the same operator:

a) specific check words (MCSi) are formed, which are individual to each program (Pi) controlled by said operator, each specific check word (MCSi) being obtained by diversification of a single check word, called the root check word (MCR) individual to the operator, diversification in particular taking place on the basis of diversification parameters (PDi) individual to each program controlled by said operator, b) each program (Pi) is scrambled with the aid of the specific check word (MCSi) individual thereto, c) access title check messages (MCTA) are formed in two parts:

a first part, common to all the programs of the same operator and constituted by a common access title check message (MCTAC), said common part containing an identifier (ID) of the program operator and the service key (CS) and at least one cryptogram (CMCR) of the root check word (MCR) individual to each program operator, a second part, specific to each program (Pi) and which is constituted by specific access title check messages (MCTASi) individual to each program (Pi) controlled by the same operator, said specific messages (MCTASi) containing the access conditions (CAi) to the different programs (Pi) controlled by the same operator, the diversification parameters (PDi) if they are different from the access conditions (CAi) and a cryptographic redundancy (RCi) guaranteeing the integrity of the complete message formed by the first and second part.

It should also be noted that the use of a root check word and the diversification of such a word has been disclosed in FR-A-2,680,589 (EP-A-528,730), but in a different context, namely that of transmitting and receiving personalised programs. The diversification is then dependent on the identification of each recipient.

The present invention also relates to a process for receiving programs which have been transmitted in accordance with the process defined hereinbefore. In general, known manner in such a process scrambled programs (Pe) are received, one scrambled program (Pei) is selected, a check is made to establish if the access criteria (CAi) are fulfilled and on the basis of the received access title check message (MCTA), there is a calculation of the check word (MC) used for the scrambling on transmission and the selected program is descrambled.

The process according to the invention is characterized in that, with the aid of the common part of the access title check message (MCTAC) individual to the operator, the root check word (MCR) is restored and, on the basis of the specific part of the access title check message (MCTASi) individual to the selected program (Pi), the specific check word (MCSi) individual to said selected program (Pi) is restored using the root check word (MCR) and then, with the aid of the thus restored, specific check word (MCSi), the selected program (Pi) is descrambled.

DETAILED DESCRIPTION OF EMBODIMENTS

Figure 1:
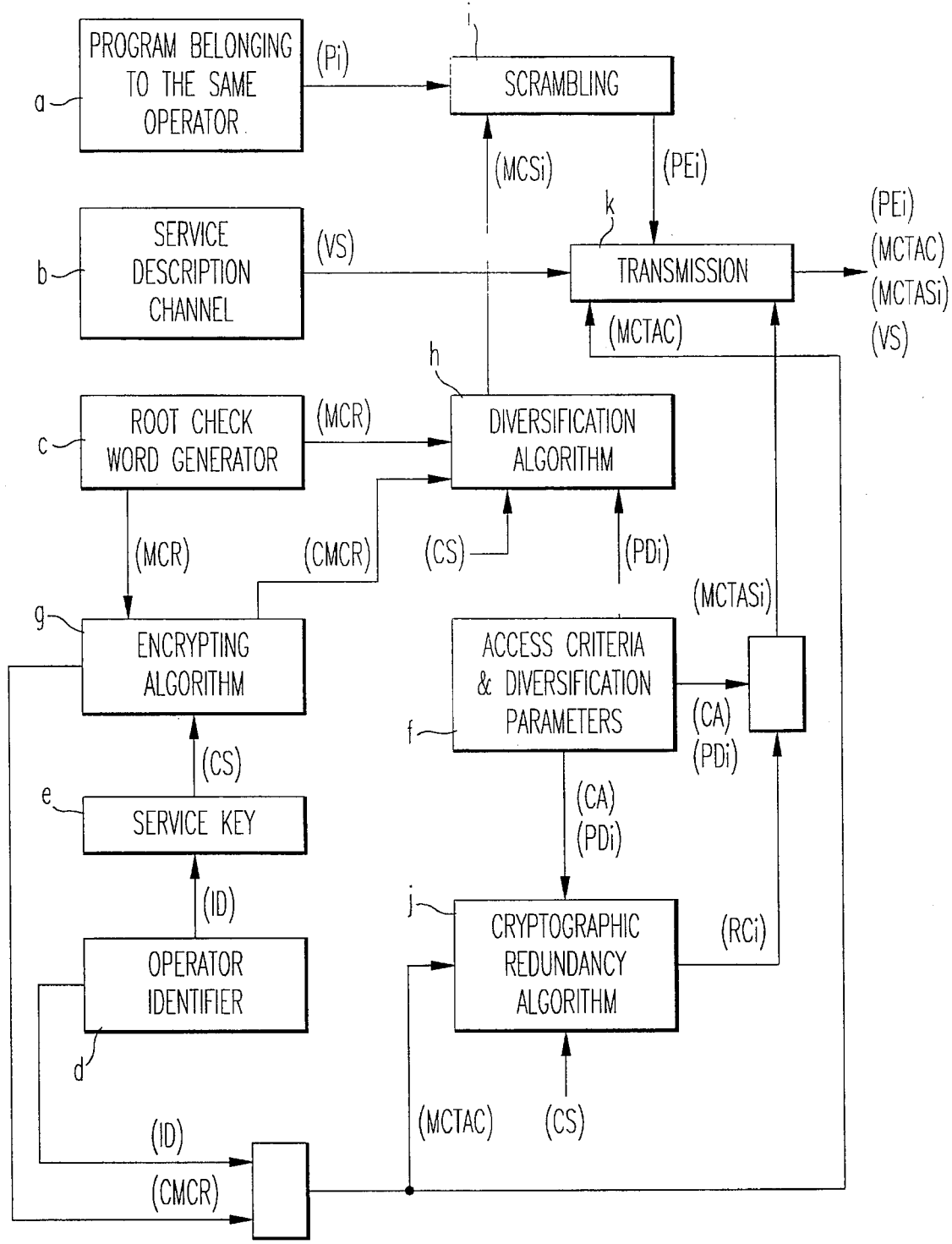
FIG. 1 illustrates an embodiment of the transmission process according to the invention.

The programs controlled by the same operator are designated Pi, in which i assumes all integral values from 1 to n, if n is the number of programs.

A program belonging to one operator comprises program elements EP1 to EPn often called program components (video, audio, data), service data making it possible to describe the structure of the program and different signals necessary for acquiring the program. If the program is protected by conditional access means, program access check messages are transmitted on the same support as the program in a specialized channel grouping all the conditional access messages of programs belonging to the operator (and optionally all the other programs if it is wished to optimize the switching time from one program to another).

The check messages of the access titles of the programs or program elements belonging to the same operator are described in two parts in accordance with one of the features of the invention:

a) a first, common part MCTAC containing:
the identifier of the program operator ID and the service key used CS,
the cryptogram or cryptograms of one or more root check word or words CMCR, b) a second part, specific to each program or each program element having a different access condition and designated MCTASi, said second part containing:
an access condition field CA,
a specific diversification parameter PDS, which must be specific to the access to the program, i.e. can be the access condition field and/or parameters such as the program or program element logic reference, said field may not be transmitted if the chosen diversification parameter is limited to the access condition field CA, because it is necessarily described in the specific part,
a cryptographic redundancy RC ensuring the integrity of the complete message (common part+specific part).

The structure of such messages can be as follows:
Common part:

| Service identifier | Root check word cryptogram or cryptograms. |
|---|---|

Specific parts corresponding to n programs or program elements belonging to the same operator:

| Access conditions 1 + [diversification parameter 1] | Cryptographic redundancy 1 |
|---|---|
| Access conditions 2 + [diversification parameter 2] | Cryptographic redundancy 2 |
| Access conditions n + [diversification parameter n] | Cryptographic redundancy n |

The performance of the invention then takes place in the following way.

A) In the transmission phase:
A description channel of the service VS is produced describing the organization of the programs, for each program or program element and the access title check message indicators (common part and specific parts). In the description channel of the services, a "multi-programming" indication can be created in order to permit the link between programs belonging to the same operator.
The root check words MCR are taken at random and the calculation of the diversified check words MCSi is carried out in order to initialize each of the scramblers associated with the program elements.
The access check messages containing the common part and the specific parts are produced and transmitted in association with the programs.

B) In the reception phase:
By means of the service description channel selection takes place of the program chosen by the user, as well as the access check message or messages making it possible to descramble the program element or elements. These messages are formed by the common part and the parts specific to each access condition field.
The security processor of the recipient checks, for each access check message (common part and specific part) that the message is complete, that it has a satisfactory access criterion and it calculates the diversified check word MCSi from the root check word MCR and the retained diversification parameter PDi.
The diversified check word MCSi initializes the descrambling device, which makes it possible to restore in uncoded form the program Pi or the program element or elements.

Figure 2:
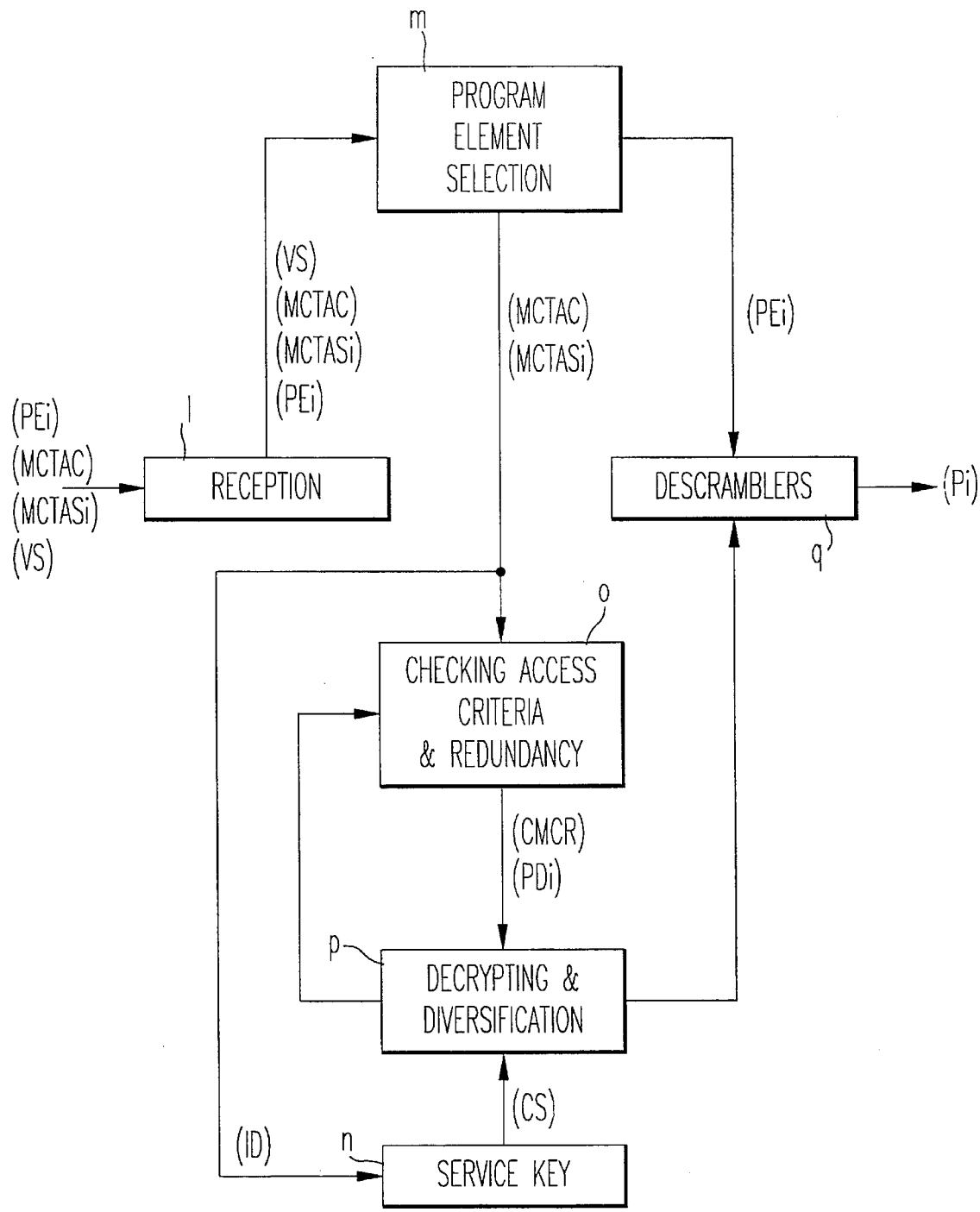
FIG. 2 illustrates an embodiment of the reception process according to the invention.

These different operations are illustrated in FIG. 1 (on transmission) and FIG. 2 (on reception). In these drawings, the different blocks shown correspond to different operations. It must not be considered that these operations are necessarily performed by the same number of independent circuits. The expert knows that these operations are usually performed on an overall basis by microprocessors, both on transmission and on reception.

In FIG. 1, the references a,b,c, . . . i correspond to the following operations:

a) the programs or program elements to be transmitted Pi are formed and all these programs or program elements are controlled by the same operator, b) a single service description channel VS is formed, c) in random manner a check word is formed, which is valid for all the programs and which constitutes the root check word MCR, d) an operator identifier ID is defined, e) a service key CS associated with the identifier ID is defined, f) definition takes place of the access criteria CA which must be satisfied in order to have the right to use the service key CS, g) on the basis of the root check word MCR and the service key CS use is made of an encrypting algorithm AC in order to obtain a cryptogram of the root check word CMCR, h) on the basis of the root check word MCR and its cryptogram CMCR, diversification parameters PDi and the service key CS, use is made of a diversification algorithm AD, which supplies specific check words MCSi, i) the programs Pi are scrambled with the aid of specific check words MCSi and scrambled programs PEi are obtained, j) on the basis of the service key CS, the first part of the access title check messages MCTAC, access criteria CA and diversification parameters PDi, the cryptographic redundancy RCi is formed and then the second part of the access title check messages MCTASi is formed, k) transmission takes place of all the scrambled programs PEi, the service description channel VS, the common part of the access check message MCTAC and the specific parts of the specific access title check messages MCTASi containing:
  the diversification parameters PDi if these parameters are not limited only to the access conditions field CAi,
  the cryptographic redundancy RCi,
  the access criteria CAi.

The operations performed on reception are illustrated in FIG. 2 by blocks 1 to q. Here again the operations are designated by letters corresponding to the following paragraphs:

l) reception takes place of the scrambled programs or program elements PEi, the service description channel VS, the access title check messages (common part MCTAC and specific part MCTASi containing the access criteria CAi, the diversification parameters PDi and the cryptographic redundancy RCi), m) selection takes place of a program or program element PEi and extraction takes place of the common parts of the access title check messages MCTAC and the specific part of the chosen program MCTASi, n) the service key CS is restored from the identifier ID contained in the MTAC, o) on the basis of the two parts of the access title check messages MCTAC and MCTASi, a check is made to establish if the access criteria CA are fulfilled by the access titles of the recipient and a check is made on the cryptographic redundancy RCi using the service key CS and the root check word MCR is supplied, p) on the basis of the cryptogram of the root check word CMCR, of the service key CS, use is made of an inverse algorithm $AC^{-1}$ of the encrypting algorithm AC used on transmission in operation e) and use is also made of a diversification algorithm AD, which is the algorithm used on transmission in operation f), the specific check word MCSi then being restored, q) descrambling takes place of the scrambled program elements or chosen program PEi on the basis of the specific check word MCSi and in uncoded form the program Pi or program elements are obtained.

The following description is applicable to all pay data, television or radio programs controlled by the same program operator and in particular applies to digital pay television and radio systems. This description is applicable to television services using the standard MPEG2.

It is proposed to add informations making it possible to introduce access check message identifiers common to all the programs of the operator and identifiers of access check messages specific to each of the programs.

The description table of an audiovisual service is broken down into four main levels:

N1) network: all programs available on the network, said programs being organized and grouped in multiprogramming form, each multiprogramming being controlled by one operator, N2) multiprogramming: all programs controlled by the same operator, N3) program: audiovisual entity or data, N4) program element or component: the constituent components of a program (audio, video, data).

As a function of the level of the common character of the programs, the common and specific access title check message identifiers will be placed at one or other of the levels:

if the network also belongs to a single program operator, the common access check message identifiers will be placed at the network level (N1) and the specific access check message identifiers at the program level (N3) or program element level (N4), if the network is subdivided into multiprogrammings belonging to several different operators, the common access check message identifiers will be placed at the multiprogramming level (N2) and the specific access check message identifiers at the program level (N3) or program element level (N4), this procedure can be of interest for optimizing the check messages of access titles of the same program, whose program elements would be scrambled in accordance with different access conditions and in this case the common access check message identifiers will be placed at the program level (N3) and the specific access check message identifiers at the program element level (N4).

As the description of ISO MPEG2 (International Standard Organization-Motion Picture Expert Group 2) in its November 1993 version (doc. ISO/IEC 1-13818CD) abides by the program and program element levels, the embodiment could be:

program description table, table identifiers, program descriptors, program identifiers, access title check message identifier (common part), program element descriptors, program element identifier, access title check message identifier (specific part).

The access title check messages are in accordance with the description given hereinbefore, choosing as the diversification parameter the access conditions field:

Common part:

| Service identifier | Root check word cryptogram or cryptograms. |
|---|---|

Specific parts corresponding to n programs or program elements belonging to the same operator:

| Access conditions 1 | Cryptographic redundancy 1 |
| Access conditions 2 | Cryptographic redundancy 2 |
| Access conditions n | Cryptographic redundancy n |

The ways of using the diversification algorithm can vary according to the cryptographic methods used.

Figure 3:
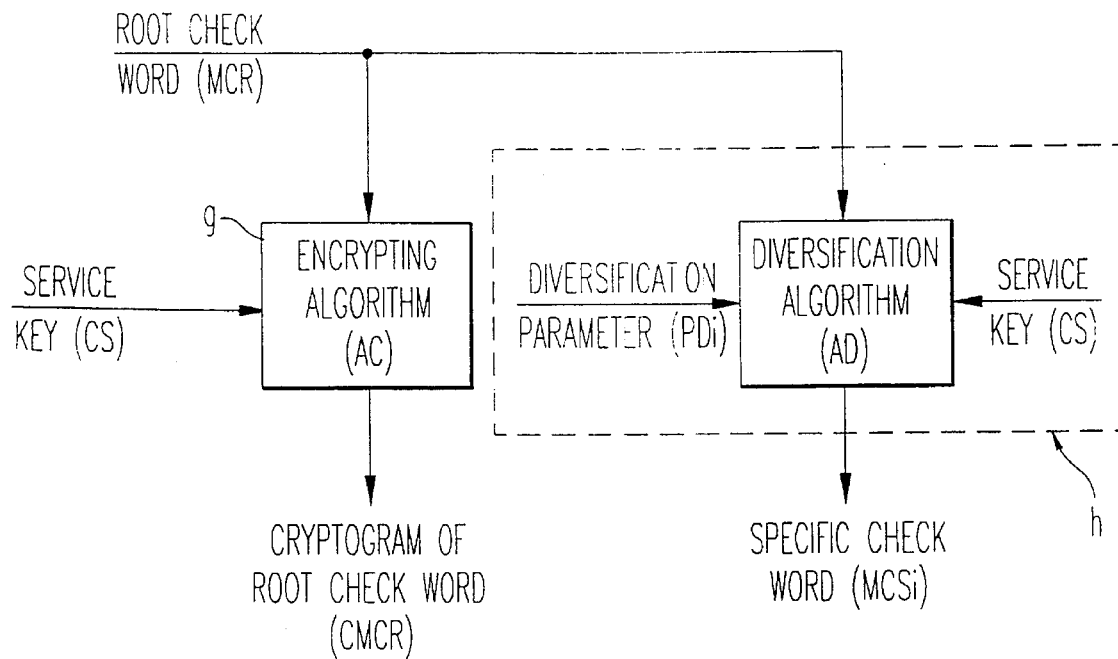
FIG. 3 shows a first way of obtaining a specific check word, on the basis of the root check word in the transmission phase.
Figure 4:
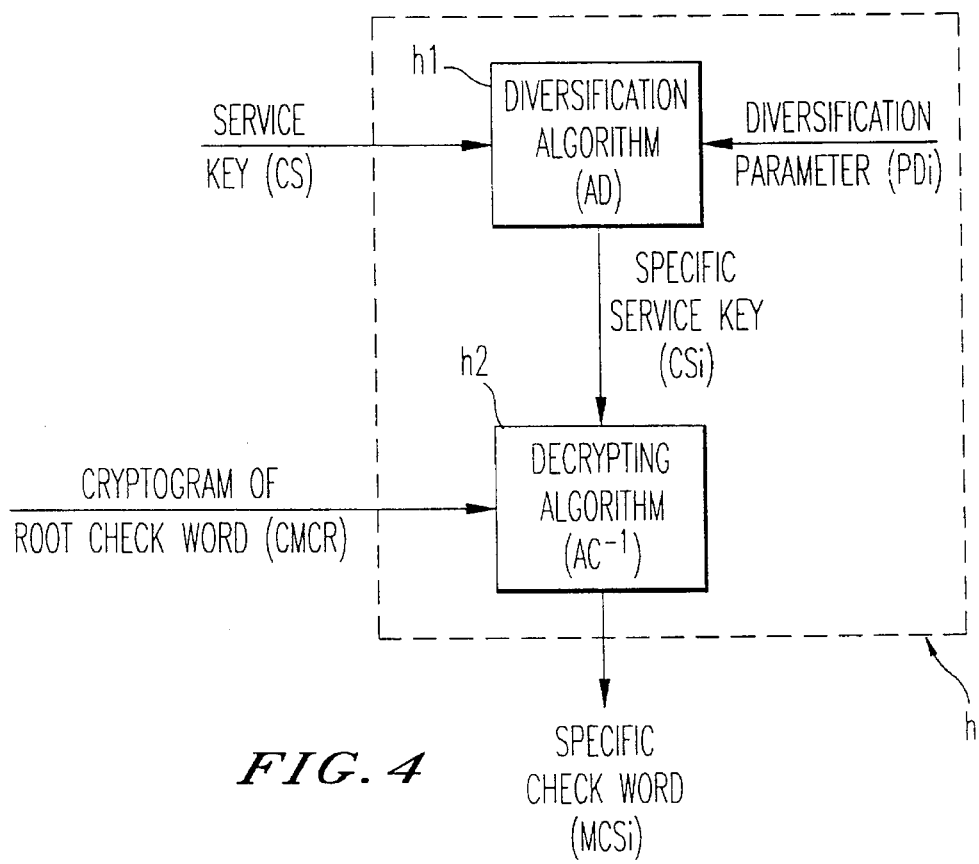
FIG. 4 shows a second way of obtaining a specific check word on the basis of the root check word in the transmission phase.
Figure 5:
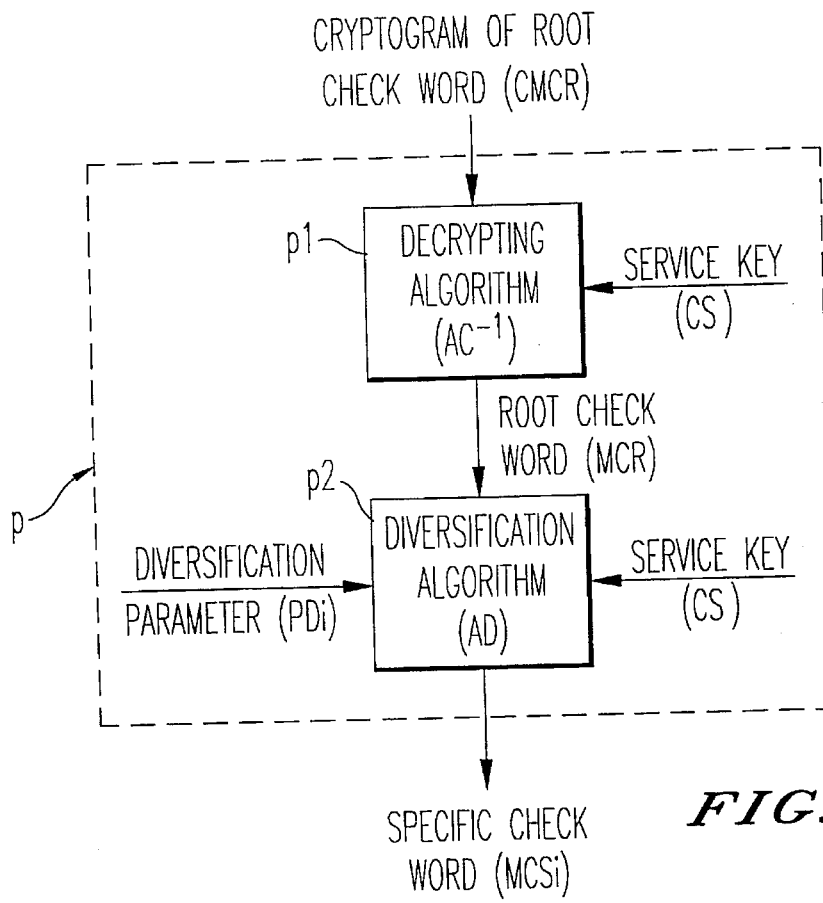
FIG. 5 shows a first way of obtaining the specific check word from the cryptogram of the root check word in the reception phase, said way being associated with the performance on the transmission side of the process illustrated in FIG. 3.
Figure 6:
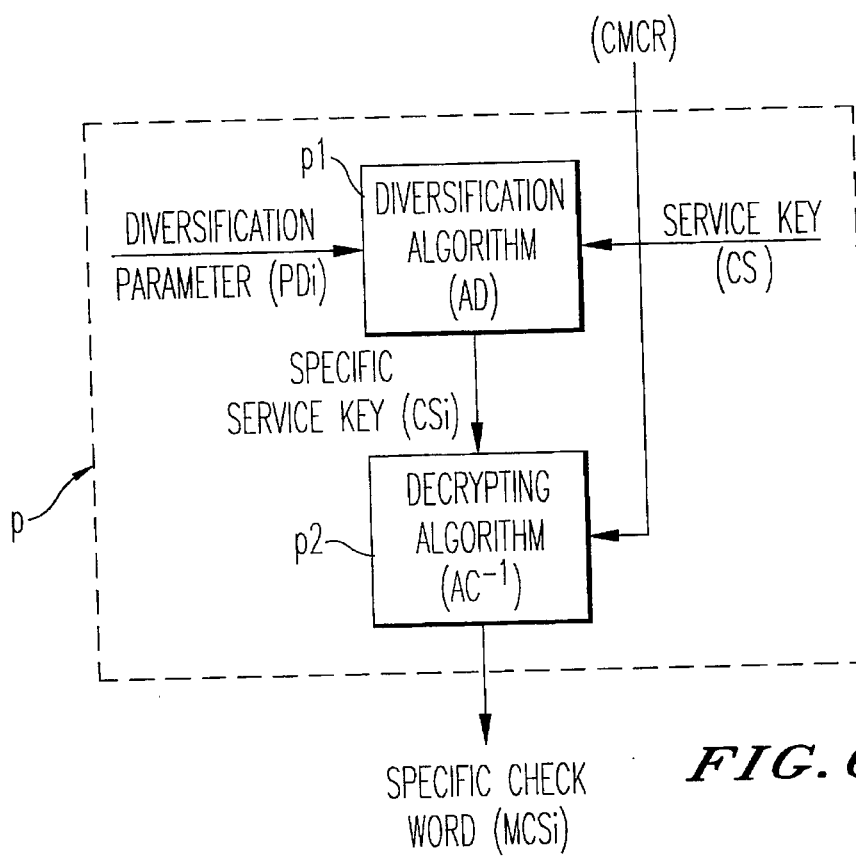
FIG. 6 shows a second way of obtaining the specific check word from the cryptogram of the root check word in the reception phase, said way being associated with the performance on the transmission side of the process illustrated in FIG. 4.

On the basis of FR-A-2,680,589, referred to hereinbefore and which describes two variants of such algorithms, it is possible to use, on transmission, the two variants illustrated in FIGS. 3 and 4 and, on reception, the two corresponding variants of FIGS. 5 and 6. The letter references used in these drawings correspond to those already used in FIGS. 1 and 2.

In the variant illustrated in FIG. 3 of the present application for obtaining, in operation h) defined hereinbefore relative to the transmission phase, specific check words MCSsi from the root check word MCSi, the diversification parameter PDi and the service key CS, the diversification algorithm AD is applied to the root check word MCR with the diversification parameter PDi serving as the diversification parameter. In order to obtain the cryptogram of the root check word CMCR, the encrypting algorithm AC is applied to the root check word MCR taking the service key CS as the encrypting parameter (operation g).

In the variant of FIG. 4, the diversification algorithm AD is applied to the service key CS using the diversification parameter PDi as the diversification parameter (operation h1), which gives a specific service key (CSi). The decrypting algorithm $AC^{-1}$ is then applied to the cryptogram of the root check word CMCR taking the personalised service key as the decrypting parameter (operation h2), which gives the specific check word MCSi.

On reception, in the case of the first variant illustrated in FIG. 5, to obtain from the cryptogram of the root check word CMCR, the service key CS and the diversification parameter PDi, the specific check word MCSi, the first stage is to apply to the cryptogram of the root check word CMCR the inverse decrypting algorithm $AC^{-1}$ taking the service key CS as the decrypting parameter (operation p1), which gives the root check word MCR. Then application takes place to said root check word MCR of the diversification algorithm AD taking the diversification parameter PDi as the diversification parameter (operation p2), which finally gives the specific check word MCSi.

In the second variant illustrated in FIG. 6, to obtain from the cryptogram of the root check word CMCR, the service key CS and the diversification parameter PDi, the specific check word MCSi, the first stage (operation p1) is to apply the diversification algorithm AD to the service key CS, the diversification parameter PDi, which gives a specific service key CSi. Then, in operation p2, application takes place of the decrypting algorithm $AC^{-1}$ to the cryptogram of the root check word CMCR using the specific service key CSi as the decrypting parameter, which finally gives the specific check word MCSi.

In no matter what variant, when the specific check word has been obtained, it is applied to a pseudorandom generator or to a descrambling algorithm supplying encrypting sequences on transmission and decrypting sequences on reception.

The means for scrambling and descrambling the data can be constituted in conventional manner by XOR gates, whereof one input receives the encrypting/decrypting sequences and the other the data in uncoded/scrambled form and whereof the output supplies the data in scrambled/uncoded form.

In practice, the processing operations can be carried out by a security processor (smart card). The processor supplies the encrypting/decrypting sequences to be applied to the data to be scrambled/descrambled.

Examples of realizing encrypting algorithms and cryptographic redundancy algorithms are known to the expert and do not per se constitute an object of the invention. Such algorithms are e.g. illustrated in FR-A-2,680,589, to which reference has been made on a number of occasions in the present description.

I claim:

1. Process for the transmission of conditional access programs, in which each of the programs are scrambled by a check word (MC) applied thereto so to limit access to the programs, an access title check message (MCTA) is formed, more particularly containing access criteria (CA) and at least one cryptogram of at least one check word (CMC) obtained by using an encrypting algorithm (AC) and transmission takes place of the scrambled program (PE), as well as the access title check message (MCTA), said process being characterized in that, for the programs (Pi) which are controlled by the same operator:

a) specific check words (MCSi) individual to each program (Pi) controlled by said operator are formed, each specific check word (MCSi) being obtained by diversification of a single check word known as the root check word (MCR) individual to the operator, diversification more particularly taking place on the basis of diversification parameters (PDi), b) each program (Pi) is scrambled with the aid of the specific check word (MCSi) individual thereto, c) access title check messages (MCTA) are formed in two parts:

a first part, common to all the programs of the same operator and which is constituted by a common access title check message (MCTAC), said common part containing a service identifier (ID) of the program operator, and at least one cryptogram (CMCR) of the root check word (MCR) individual to each program operator, a second part, specific to each program (Pi) and constituted by specific access title check messages (MCTASi), individual to each program (Pi) controlled by the same operator, said specific messages (MCTASi) containing at least the access conditions (CAi) to the various programs (Pi) controlled by the same operator, the diversification parameters (PDi) if different from the access conditions (CAi) and a cryptographic redundancy (RCi) guaranteeing the integrity of the complete message formed by the first common part and the second specific part.

2. Process according to claim 1, characterized in that transmission also takes place of a signalling signal constituted by a service channel (VS), which contains, for each program (Pi) or program element, access title check message indicators.

3. Process according to claim 2, characterized in that the service channel also contains a multiprogramming information, which is a same program simultaneously broadcast on several logic channels where each simultaneous broadcast is respectively time shifted, thereby making it possible to create a link between different programs.

4. Process according to claim 1, characterized in that, to obtain specific check words (MCSi) from the root check word (MCR) and parameters (PDi) identifying the programs and a service key (CS), to the root check word is applied a diversification algorithm (AD) using the service key (CS) and the diversification parameter (PDi).

5. Process according to claim 1, characterized in that, to obtain specific check words (MCSi) from the root check word (MCR), parameters (PDI) identifying the programs and a service key (CS), a diversification algorithm (AD) is applied to the service key (CS) using the diversification parameter (PDi), which gives a specific service key (CSi) and then to the cryptogram of the root check word (CMCR) is applied an inverse decrypting algorithm ($AC^{-1}$) of the encrypting algorithm (AC) using the specific service key (CSi) as the decrypting parameter.

6. Process for receiving programs (Pi) transmitted according to the process of claim 1, in which scrambled programs (Pe) are received, a scrambled program (Pei) is selected, a check is made to establish if the access criteria (CAi) are fulfilled, on the basis of the received access title check message (MCTA) reconstitution takes place of the check word (MC) used for scrambling on transmission and the selected program is descrambled, said process being characterized in that, with the aid of the common part of the access title check message (MCTAC) individual to the operator, the root check word (MCR) is restored and, on the basis of the specific part of the access title check message (MCTASi) individual to the selected program (Pi), restoration takes place of the specific check word (MCSi) individual to said selected program (Pi) using the root check word (MCR) and then, with the aid of the thus restored, specific check word (MCSi), the selected program is descrambled.

7. Process according to claim 6, characterized in that, for obtaining from the cryptogram of the root check word (CMCR), the service key (CS) and the diversification parameter (PDi), the specific check word (MCSi), the first stage is the application to the cryptogram of the root check word (CMCR) of the inverse decrypting algorithm ($AC^{-1}$) of the encrypting algorithm (AC) taking the service key (CS) as the parameter, which gives the root check word (MCR) and then to said root check word (MCR) is applied to diversification algorithm (AD) using the diversification parameter (PDi) for finally obtaining the personalised check word (MCSi) individual to the selected program.

8. Process according to claim 6, characterized in that, for obtaining from the cryptogram of the root check word (CMCR), the service key (CS) and the diversification parameter (PDi), the specific check word (MCSi), the first stage is the application of the diversification algorithm (AD) to the service key (CS) using the diversification parameter, in order to obtain the specific service key (CSi), followed by the application to the cryptogram of the root check word (CMCR) of the inverse decrypting algorrithm ($AC^{-1}$) of the encrypting algorithm (AC) using the specific service key (CSi) as the decrypting parameter, in order to obtain the specific check word (MCSi).

9. A method for transmitting conditional access programs, comprising the steps of:

forming the conditional access programs and a single service description channel in preparation for transmission;

randomly forming a root check word which is valid for all of the conditional access programs;

defining an operator identifier, a service key, and an access criteria which must be satisfied in order to receive the conditional access programs;

encrypting the service key and the root check word to obtain a cryptogram;

applying a diversification process to the cryptogram, the root check word, the service key and a set of diversification parameters to produce a set of specific check words;

scrambling the specific check words with corresponding ones of the conditional access programs to yield respective scrambled programs;

forming a cryptographic redundancy from the service key, a common part of a set of access title check messages, the access criteria and the diversification parameters;

forming a set of specific parts of said set of access title check messages from the access criteria, the diversification parameters, and the cryptographic redundancy; and transmitting the conditional access programs comprising the scrambled programs, the service description channel, and the address check messages.

10. A method for receiving conditional access programs, comprising the steps of:

receiving the conditional access programs comprising,
a set of scrambled programs,
a service description channel, and
a set of access check messages, comprising a common part having an identifier and each comprising a specific part, said common part;

selecting a selected program from said set of scrambled programs;

extracting the common part of said set of access check messages and the specific part that corresponds to the selected program;

restoring a service key from said identifier of said common part;

checking whether an access criteria is fulfilled by the common part and the specific part by checking a cryptographic redundancy using said service key;

supplying a root check word if said access criteria is fulfilled;

restoring a specific check word comprising the step of,
applying an inverse encryption process and a diversification process to said service key and said root check word; and descrambling the selected program using said specific check word.

* * * * *